(12) United States Patent
DeJong

(10) Patent No.: US 8,391,668 B2
(45) Date of Patent: Mar. 5, 2013

(54) SUBSTRATE GUIDED RELAY HAVING AN ABSORBING EDGE TO REDUCE ALIGNMENT CONSTRAINTS

(75) Inventor: Christian Dean DeJong, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 212 days.

(21) Appl. No.: 13/005,736

(22) Filed: Jan. 13, 2011

(65) Prior Publication Data
US 2012/0182303 A1   Jul. 19, 2012

(51) Int. Cl.
*G02B 6/10* (2006.01)
(52) U.S. Cl. ........................................................ 385/146
(58) Field of Classification Search .................... None
See application file for complete search history.

(56) References Cited

U.S. PATENT DOCUMENTS

| | | | |
|---|---|---|---|
| 3,915,548 A | 10/1975 | Opittek et al. |
| 4,387,297 A | 6/1983 | Swartz |
| 4,997,261 A | 3/1991 | Taniura |
| 5,224,198 A | 6/1993 | Jachimowicz et al. |
| 5,266,788 A | 11/1993 | Yamazaki |
| 5,369,415 A | 11/1994 | Richard et al. |
| 5,465,311 A | 11/1995 | Caulfield et al. |
| 6,023,372 A | 2/2000 | Spitzer et al. |
| 6,084,724 A | 7/2000 | Wiegand et al. |
| 6,129,439 A | 10/2000 | Hou et al. |
| 6,140,979 A | 10/2000 | Gerhard et al. |
| 6,166,834 A | 12/2000 | Taketomi et al. |
| 6,245,590 B1 | 6/2001 | Wine et al. |
| 6,285,489 B1 | 9/2001 | Helsel |
| 6,331,909 B1 | 12/2001 | Dunfield |
| 6,362,912 B1 | 3/2002 | Lewis |
| 6,384,406 B1 | 5/2002 | Wine |
| 6,390,370 B1 | 5/2002 | Plesko |
| 6,404,550 B1 | 6/2002 | Yajima |

(Continued)

FOREIGN PATENT DOCUMENTS

| | | |
|---|---|---|
| EP | 0559406 | 9/1993 |
| FR | 2681702 | 3/1993 |

(Continued)

OTHER PUBLICATIONS

Amitai, Yaakov, "P-27: A Two-Dimensional Aperture Expander for Ultra-Compact, High-Performance Head-Worn Displays", *SID International Symposium*. Boston MA. May 24-27, 2005. vol. 36 05/24/205, 360-363.

*Primary Examiner* — Charlie Peng
*Assistant Examiner* — Mary El Shammaa
(74) *Attorney, Agent, or Firm* — Kevin D. Wills

(57) ABSTRACT

Briefly, in accordance with one more embodiments, a substrate guided relay comprises a slab guide having an absorbing edge at a first end of the slab guide. An input coupler is disposed on a surface of the slab guide at an angle with respect to a first edge of the slab guide. An output coupler is disposed on the surface at a second end of the slab guide. Light rays that enter the slab guide toward the first end are absorbed by the absorbing edge, and light rays that enter the slab guide toward the output coupler exit the slab guide via the output coupler. The absorbing edge on the first edge of the slab guide allows the input coupler to be placed on the slab guide without regard to alignment of the input coupler with the first end of the slab guide.

14 Claims, 6 Drawing Sheets

U.S. PATENT DOCUMENTS

| | | | |
|---|---|---|---|
| 6,433,907 B1 | 8/2002 | Lippert | |
| 6,512,622 B2 | 1/2003 | Wine | |
| 6,515,278 B2 | 2/2003 | Wine | |
| 6,515,781 B2 | 2/2003 | Lewis | |
| 6,525,310 B2 | 2/2003 | Dunfield | |
| 6,577,411 B1 | 6/2003 | David | |
| 6,710,902 B2 | 3/2004 | Takeyama | |
| 6,791,760 B2 | 9/2004 | Janeczko et al. | |
| 6,821,457 B1 | 11/2004 | Natarajan et al. | |
| 6,829,095 B2 | 12/2004 | Amitai | |
| 6,833,955 B2 | 12/2004 | Niv | |
| 7,018,044 B2 | 3/2006 | Chen et al. | |
| 7,021,777 B2 | 4/2006 | Amitai | |
| 7,046,892 B2 | 5/2006 | Yoshikawa et al. | |
| 7,145,611 B2 | 12/2006 | Dubin et al. | |
| 7,158,306 B1 | 1/2007 | Cobb | |
| 7,418,170 B2 | 8/2008 | Mukawa et al. | |
| 7,570,859 B1 | 8/2009 | DeJong | |
| 7,589,901 B2 | 9/2009 | DeJong et al. | |
| 7,613,373 B1 | 11/2009 | DeJong | |
| 7,922,976 B2 * | 4/2011 | Dutta et al. | 422/82.11 |
| 2001/0031107 A1 | 10/2001 | Bradshaw | |
| 2002/0126086 A1 | 9/2002 | Takeuchi et al. | |
| 2002/0141026 A1 | 10/2002 | Wiklof | |
| 2005/0180687 A1 | 8/2005 | Amitai | |
| 2005/0253055 A1 | 11/2005 | Sprague | |
| 2006/0056758 A1 * | 3/2006 | Beausoleil et al. | 385/14 |
| 2006/0132914 A1 | 6/2006 | Weiss et al. | |
| 2006/0228073 A1 | 10/2006 | Mukawa et al. | |
| 2006/0274296 A1 | 12/2006 | Tolbert et al. | |
| 2006/0291021 A1 | 12/2006 | Mukawa | |
| 2007/0008624 A1 | 1/2007 | Hirayama | |
| 2007/0091445 A1 | 4/2007 | Amitai | |
| 2007/0159673 A1 | 7/2007 | Freeman et al. | |
| 2007/0171328 A1 | 7/2007 | Freeman et al. | |
| 2008/0025667 A1 | 1/2008 | Amitai | |
| 2009/0015929 A1 | 1/2009 | DeJong et al. | |
| 2010/0063404 A1 * | 3/2010 | Kaplan et al. | 600/478 |
| 2010/0111472 A1 | 5/2010 | DeJong | |
| 2010/0266240 A1 * | 10/2010 | Krishnamoorthy et al. | 385/37 |

FOREIGN PATENT DOCUMENTS

| | | |
|---|---|---|
| FR | 2866442 | 8/2005 |
| WO | WO-03/081320 | 10/2003 |
| WO | WO-2005/104566 | 11/2005 |
| WO | WO-2006/085308 | 8/2006 |
| WO | WO-2007/054928 | 5/2007 |
| WO | WO-2007/062098 | 5/2007 |
| WO | WO-2008/023367 | 2/2008 |

* cited by examiner

US 8,391,668 B2

SUBSTRATE GUIDED RELAY HAVING AN ABSORBING EDGE TO REDUCE ALIGNMENT CONSTRAINTS

BACKGROUND

A substrate guided relay may be utilized in a head-up display (HUD) system or the like to generate one or more copies of an input light and to homogenize the input light applied to the user's eye. Such a substrate guided relay generally may comprise an input coupler, a slab guide, and an output coupler. The input coupler is disposed at an angle with respect to the slab guide to internally reflect the input beam and to make multiple copies of the input beam by application of Brewster's formula to control the internal reflection of the copies of the input beam. However, alignment of the input coupler and the slab guide may be difficult. The surface bond of the input coupler on the slab guide controls alignment in a first direction since one surface of the input coupler abuts the surface of the slab guide, but alignment of the input coupler to the edges of the slab guide involves precision to achieve a sufficient amount of alignment.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
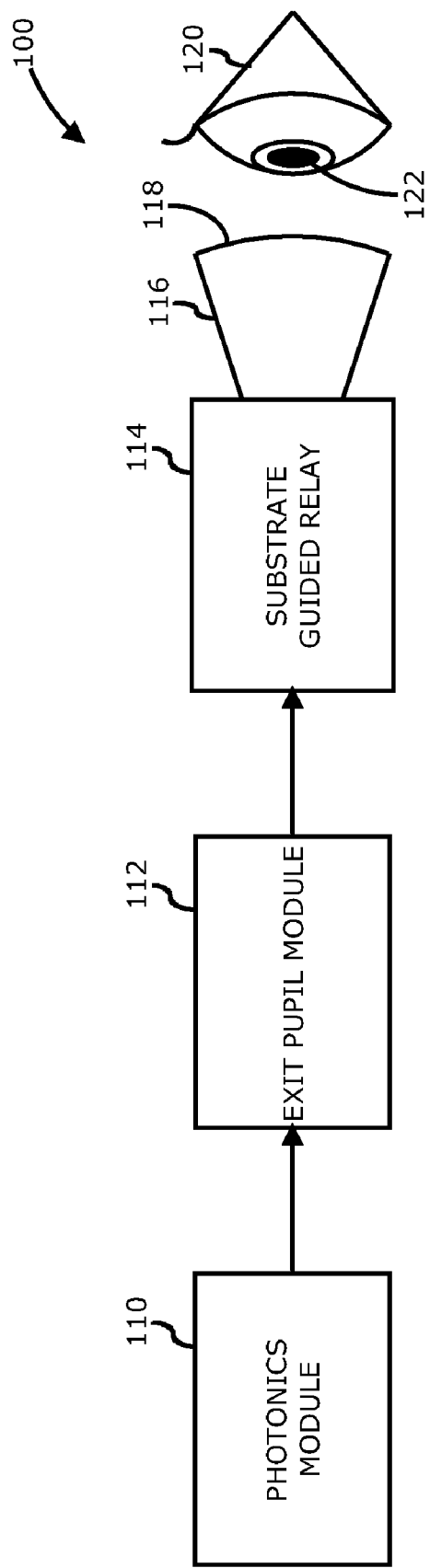
FIG. 1 is a block diagram of a display system that includes a substrate guided relay in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 5:
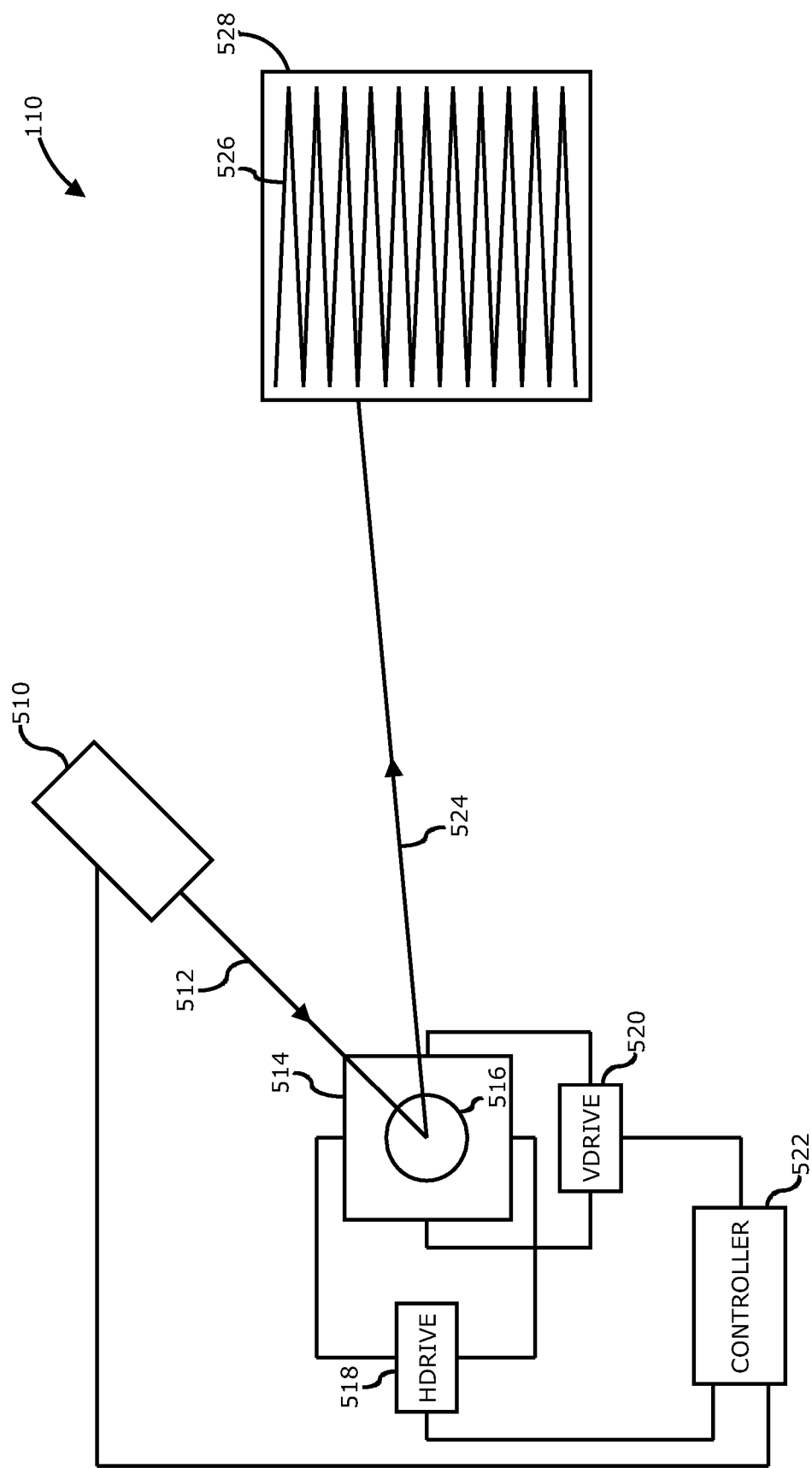
FIG. 5 is a diagram of a scanned beam display as one example of a photonics module of FIG. 1 that may be utilized with a substrate guided relay in accordance with one or more embodiments.

Referring now to FIG. 1, a block diagram of a display system that includes a substrate guided relay in accordance with one or more embodiments will be discussed. As shown in FIG. 1, display system 100 may comprise a head-up display (HUD) or the like that may be deployed in a head mount arrangement or in a vehicle display system as one of several example. Such a display system 100 may comprise a photonics module 110 or a projector that is capable of creating and projecting an image. An example of such a photonics module 110 is shown in and described with respect to FIG. 5, below. The output of photonics module 110 may be provided to an exit pupil module 112 that may be configured to expand the exit pupil of the output of photonics module 110, or alternatively may be configured to reduce the exit pupil of the output of photonics module 110 depending on the type of display technology of photonics module 110. For example, photonics module 110 may comprise a scanned beam display such as shown in FIG. 5 that scans a beam such as a laser beam in a raster pattern to generate a displayed image. Such a photonics module 110 may have a relatively small exit pupil that is smaller than a pupil 122 of the eye 120 of the user, in which case exit pupil module 112 may be configured to expand the exit pupil of the output of photonics module 110 to be larger than the pupil 122 of the user's eye 120 when the ultimate exit pupil 118 reaches the user's pupil 122. In such embodiments, exit pupil module 112 may comprise a microlens array (MLA) that operates to provide numerical aperture expansion of the beam in order to result in a desired expansion of the exit pupil. By expanding the exit pupil in such a manner, vignetting in the displayed image may be reduced or eliminated. Alternatively, photonics module 110 may comprise a digital light projector (DLP) or a liquid-crystal on silicon (LCOS) projector that generates a relatively larger sized exit pupil. In such embodiments, exit pupil module 112 may be configured to reduce the exit pupil of the image generated by photonics module 110 to be closer to, but still larger than, the pupil 122 of the user's eye 120. However, these are merely examples of how the exit pupil module 112 may alter the exit pupil of the image generated by photonics module 110, and the scope of the claimed subject matter is not limited in these respects.

In one or more embodiments, the image generated by photonics module 110 may be processed by a substrate guided relay (SGR) 114 which may operate to create one or more copies of the input light from photonics module 110 to create an output 116 that is more homogenized when image reaches the user's eye 120. An example of such a substrate guided relay 114 and the operation thereof is shown in and described in U.S. Pat. No. 7,589,091 which is hereby incorporated herein by reference thereto in its entirety. In accordance with one or more embodiments, a substrate guided relay having an absorbing edge is shown in and described with respect to FIG. 2, below.

Figure 2:
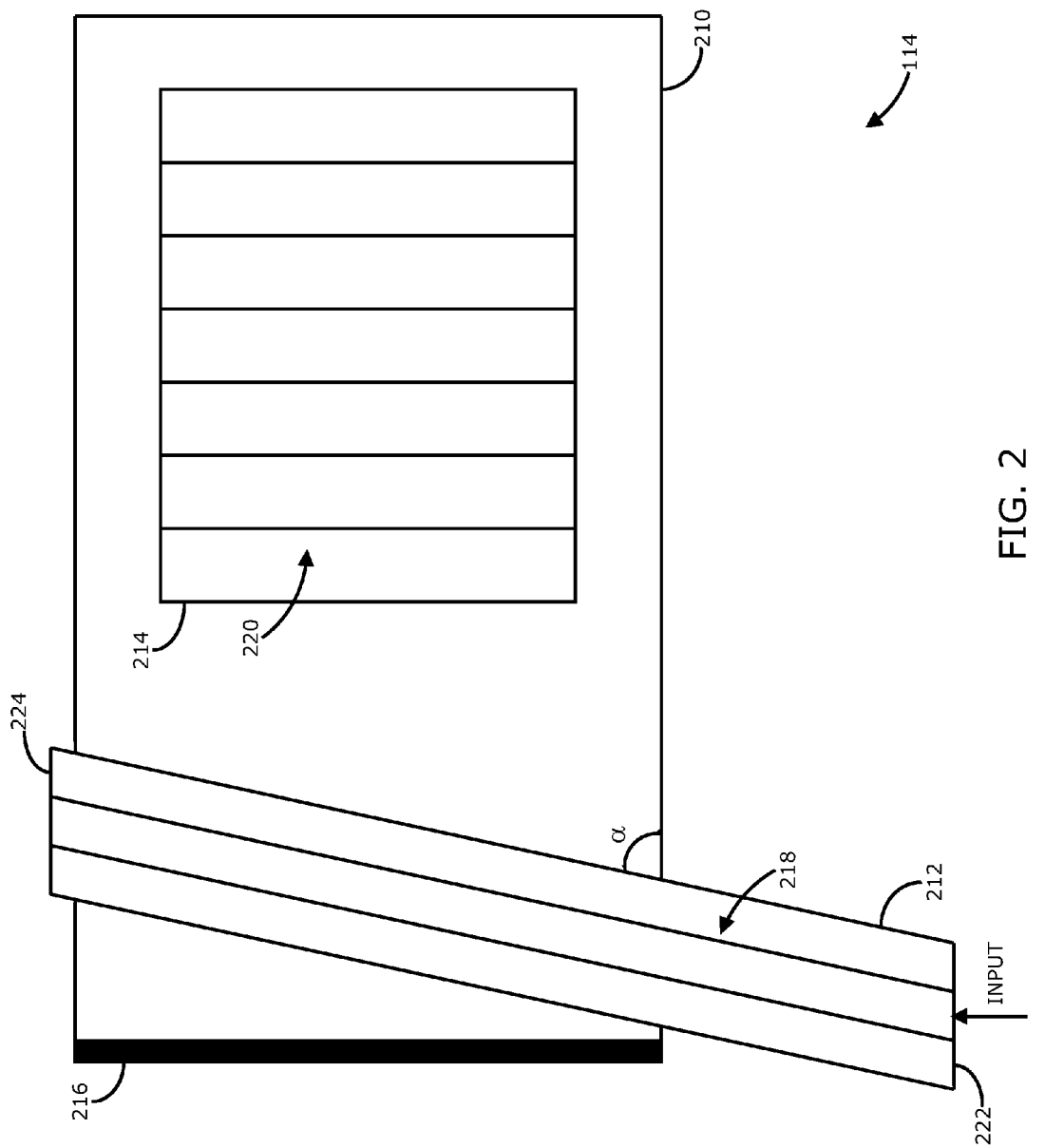
FIG. 2 is a top plan view of a substrate guided relay capable of being utilized with the display system of FIG. 1 in accordance with one or more embodiments.

Referring now to FIG. 2, a top plan view of a substrate guided relay capable of being utilized with the display system of FIG. 1 in accordance with one or more embodiments will be discussed. As shown in FIG. 2, substrate guided relay 114 may comprise a slab guide 210 having an input coupler 212 and an output coupler 214. The input coupler 212 is disposed on a surface of the slab guide 210 to receive the image beam as an input at a first end 222 of the input coupler 212 wherein the input beam traverses through the input coupler 212 to the second end 224 of the input coupler 212. The input beam traverses through the input coupler 212 to create multiple copies of the input beam and to feed the multiple copies of the input beam into the slab guide 210. The input coupler 212 generally may be disposed at an angle, $\alpha$, with respect to a long edge of the slab guide 210 so that the input coupler 212 is disposed at an angle complementary to angle, $\alpha$, with respect to the angle of incidence of the input beam. Input coupler 212 may comprise two or more parallel internal surfaces 218, for example two to five internal surfaces 218, to facilitate the multiple internal reflections and therefore multiple copies of the input beam and to facilitate redirection of those rays from input coupler 212 into slab guide 210. The parallel internal surfaces 218 are also parallel to the external surfaces of the input coupler 212. As multiple copies of the input beam exit the input coupler 212 and enter into slab guide 210 through the boundary between 212 and 210. This boundary may be a coating or a difference of index between 212 and 210 and allow some of the light to continue to travel in 212 and some rays of light to transmit into 210. These light rays may be generally directed toward one end of the slab guide 210 or the other. The light rays that are directed toward the output coupler 214 will exit the slab guide 210 via the output coupler 214 to be directed toward the user's eye 120 as output 116. The output coupler 214 may include multiple parallel internal surfaces 220 to help capture and redirect light rays from the slab guide 210 to exit via the output coupler 214 as output 116. The light rays that are directed away from the output coupler 214 are absorbed by absorbing edge 216 that is disposed at an end of the slab guide 210 away from the end of the slab guide 210 at which output coupler 214 is disposed. As a result, the light rays that impinge on the absorbing edge 216 are absorbed, or sufficiently attenuated, such that those absorbed light rays do not ever reach output coupler 214 and do not exit slab guide 210. Without the presence of absorbing edge 216, some light rays that would otherwise be absorbed by the absorbing edge 216 would otherwise possibly eventually reach output coupler 214 and create an intended ghost image or other image artifact. By utilization of the absorbing edges, the rays that would cause such image artifacts are absorbed by the absorbing edge 216 in order to sufficiently reduce or eliminate those rays.

In one or more embodiments, the boundary between input coupler 212 and slab guide 210, and between slab guide 210 and output coupler 214, may be may be coated or treated in some way to control the amount of light that passes through these boundaries. Such boundary interfaces could be separate treatments and/or or the same treatment and/or coatings used for both interfaces. If the treatment that controls the transition of light from input coupler 212 to slab guide 210 is disposed on the surface of input coupler 212 rather on the surface of 210, then the angular alignment precision requirements between 212 and 210 are reduced also in one or more planes perpendicular to the plane of the angle alpha. However, these are merely example embodiments for the interfaces between the elements of substrate guided relay 114, and the scope of the claimed subject matter is not limited in these respects.

In one or more embodiments, the use of absorbing edge 216 on slab guide 210 has the result that no precise alignment is required between the input coupler 212 and the edge of the slab guide 210. As a result, one of the alignment constraints for the input coupler 212 is reduced or otherwise eliminated, which results in simpler alignment of the input coupler 212 with respect to the slab guide 210. Further details of the substrate guided relay 114 are shown in and described with respect to FIG. 3 and FIG. 4, below.

Figure 3:
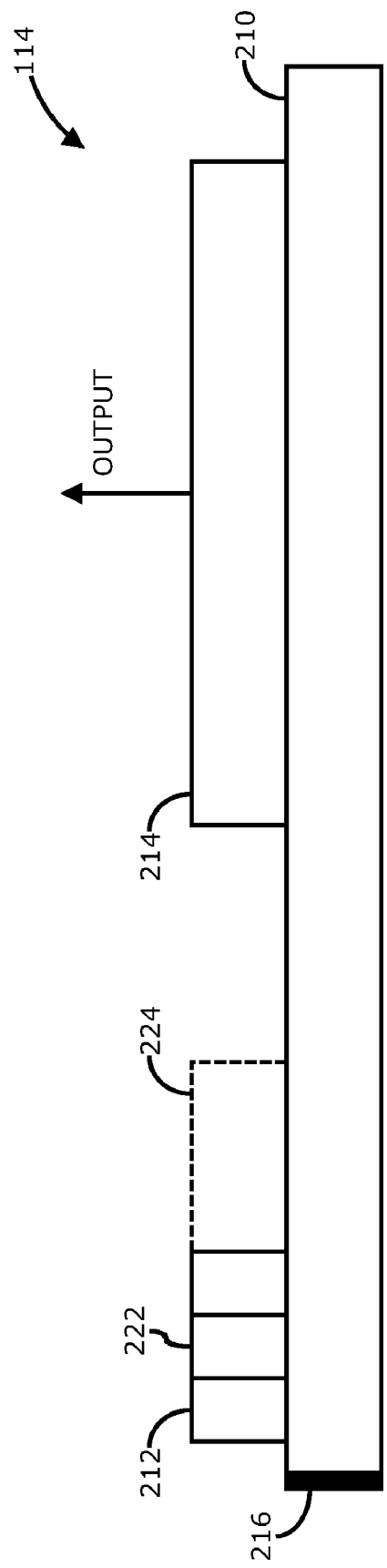
FIG. 3 is an elevation view of the substrate guided relay of FIG. 2 in accordance with one or more embodiments.

Referring now to FIG. 3, an elevation view of the substrate guided relay of FIG. 2 in accordance with one or more embodiments will be discussed. FIG. 3 shows the substrate guided relay 114 in an edge view. The input beam is directed into the input coupler 212 at end 222 and travels through the input coupler 212 toward end 224 and is eventually directed into the slab guide 210. Light rays that travel toward the left are absorbed by absorbing edge 216 are absorbed, and light rays that travel to toward the right are redirected out of the slab guide through the output coupler 214 as output 116 towards the user's eye 120. Further details of such operation of substrate guided relay are shown in and described with respect to FIG. 4, below.

Figure 4:
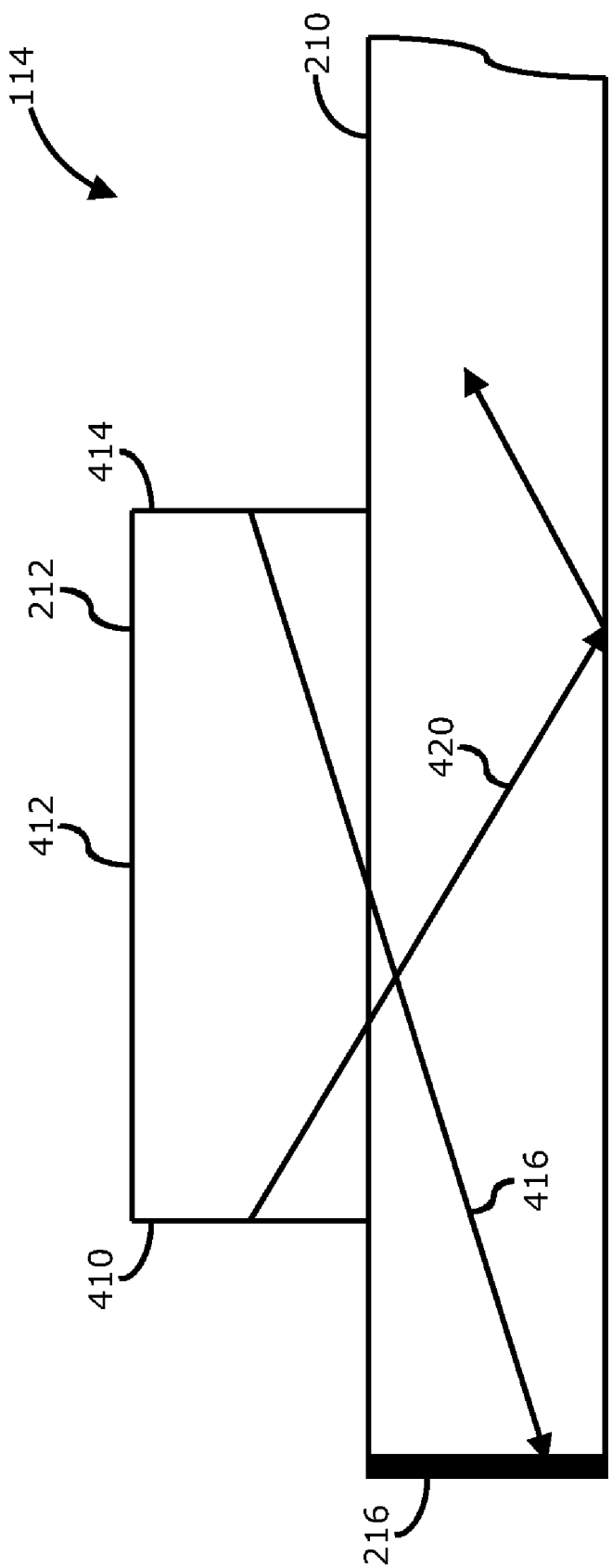
FIG. 4 is an elevation view of the substrate guided relay of FIG. 3 illustrating how light rays are directed toward an output coupler or are absorbed by an absorbing edge in accordance with one or more embodiments.

Referring now to FIG. 4, an elevation view of the substrate guided relay of FIG. 3 illustrating how light rays are directed toward an output coupler or are absorbed by an absorbing edge in accordance with one or more embodiments will be discussed. FIG. 4 shows an end view of the substrate guided relay 114 showing further detail at the input coupler 212. Input coupler 212 may comprise three surfaces 410, 412, and 414. Light rays in input coupler 212 that reflect off of surface 410 generally are directed into the slab guide 210 to the right toward the output coupler 214, for example as shown by light ray 420. Light rays in input coupler 212 that reflect off of surface 414 generally are directed to the left toward absorbing edge 216 and are thus absorbed by absorbing edge 216 and therefore do not exit the slab guide 210, for example as shown by light ray 416. Light rays reflecting off of surface 412 may be directed into slab guide 210 either toward the left or toward the right. Those rays reflecting off of surface 412 toward the left are absorbed by absorbing edge 216 in a manner similar to light ray 416, and those rays reflected off of surface 412 toward the right are directed to the output coupler 210 to exit as output 116 in a manner similar to light ray 416. Since the absorbing edge 216 operates to reduce or eliminate those light rays that are leftwardly traveling through the slab guide 210, those leftwardly traveling rays do not affect the output 116, and as a result eliminates the need to align the input coupler to the edge of slab guide 210 at which absorbing edge 216 is disposed. An example of a scanned beam display that may be utilized as the photonics module 110 to generate the input beam for the substrate guided relay 114 is shown in and described with respect to FIG. 5, below.

Referring now to FIG. 5, a diagram of a scanned beam display as one example of a photonics module of FIG. 1 that may be utilized with a substrate guided relay having an absorbing edge in accordance with one or more embodiments will be discussed. Although FIG. 1 illustrates one type of a photonics module 110 for purposes of discussion, for example a microelectromechanical system (MEMS) based display, it should be noted that other types of photonics modules 110 may be utilized, including those that use two uniaxial scanners, rotating polygon scanners, or galvonometric scanners as well as systems that use the combination of a one-dimensional spatial light modulator with a single axis scanner as some of many examples, which may also utilize the claimed subject matter and the scope of the claimed subject matter is not limited in this respect. Furthermore, photonics modules 110 that are not scanned beam projectors but rather have two-dimensional modulators that introduce the image information in either the image plane or Fourier plane and which introduce color information time sequentially or using a filter mask on the modulator as some of many examples, may also utilize the claimed subject matter and the scope of the claimed subject matter is not limited in this respect. Details of operation of scanned beam display are discussed, below.

As shown in FIG. 5, photonics module 110 comprises a light source 510, which may be a laser light source such as a laser or the like, capable of emitting a beam 512 which may comprise a laser beam. In some embodiments, light source 510 may comprise two or more light sources, such as in a color system having red, green, and blue light sources, wherein the beams from the light sources may be combined into a single beam. In one or more embodiments, light source 510 may include a first full color light source such as a red, green, and blue light source, and in addition may include a fourth light source to emit an invisible beam such as an ultraviolet beam or an infrared beam. The beam 512 is incident on a scanning platform 514 which may comprise a microelectromechanical system (MEMS) based scanner or the like in one or more embodiments, and reflects off of scanning mirror 516 to generate a controlled output beam 524. In one or more alternative embodiments, scanning platform 514 may comprise a diffractive optic grating, a moving optic grating, a light valve, a rotating mirror, a spinning silicon device, a digital light projector (DLP) device, a flying spot projector, or a liquid-crystal on silicon (LCOS) device, or other similar scanning or modulating devices. A horizontal drive circuit 518 and/or a vertical drive circuit 520 modulate the direction in which scanning mirror 516 is deflected to cause output beam 524 to generate a raster scan 526, thereby creating a displayed image, for example on a display screen and/or image plane 528. A display controller 522 controls horizontal drive circuit 518 and vertical drive circuit 520 by converting pixel information of the displayed image into laser modulation synchronous to the scanning platform 514 to write the image information as a displayed image based upon the position of the output beam 524 in raster pattern 526 and the corresponding intensity and/or color information at the corresponding pixel in the image. Display controller 522 may also control other various functions of photonics module 110.

In one or more embodiments, a horizontal axis may refer to the horizontal direction of raster scan 526 and the vertical axis may refer to the vertical direction of raster scan 526. Scanning mirror 516 may sweep the output beam 524 horizontally at a relatively higher frequency and also vertically at a relatively lower frequency. The result is a scanned trajectory of laser beam 524 to result in raster scan 526. The fast and slow axes may also be interchanged such that the fast scan is in the vertical direction and the slow scan is in the horizontal direction. However, the scope of the claimed subject matter is not limited in these respects.

In one or more particular embodiments, the photonics module 110 as shown in and described with respect to FIG. 5 may comprise a pico-projector developed by Microvision Inc., of Redmond, Wash., USA, referred to as PicoP™. In such embodiments, light source 510 of such a pico-projector may comprise one red laser, one green laser, and one blue laser with a lens near the output of the respective lasers that collects the light from the lasers and provides a very low numerical aperture (NA) beam at the output. The light from the lasers may then be combined with dichroic elements into a single white beam 512. Using a beam splitter and/or basic fold-mirror optics, the combined beam 512 may be relayed onto biaxial MEMS scanning mirror 516 disposed on scanning platform 514 that scans the output beam 524 in a raster pattern 526. Modulating the lasers synchronously with the position of the scanned output beam 524 may create the projected image. In one or more embodiments the photonics module 114, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

Figure 6:
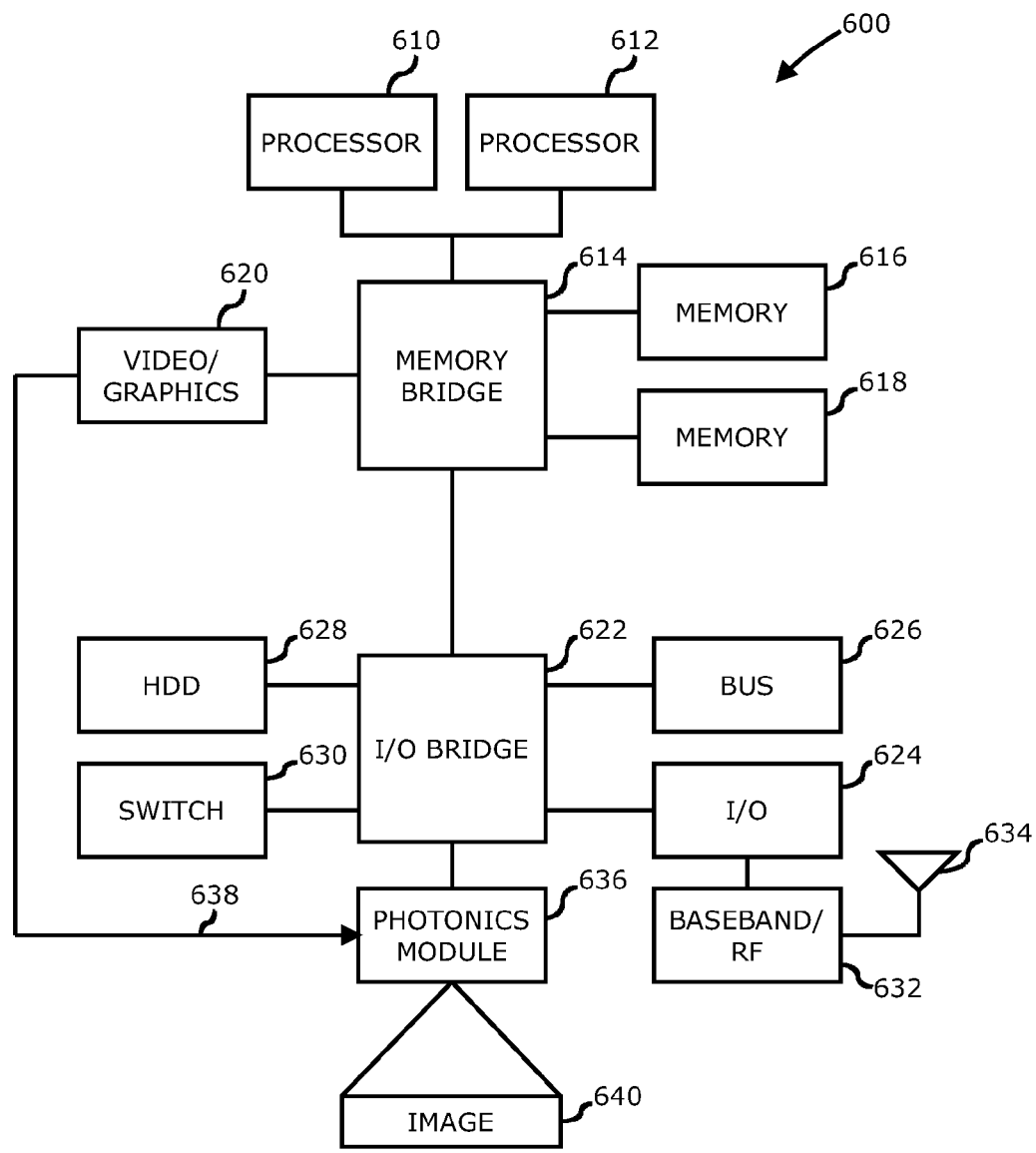
FIG. 6 is a diagram of an information handling system including a photonics module with a substrate guided relay in accordance with one or more embodiments.

Referring now to FIG. 6, a block diagram of an information handling system including a photonics module with a substrate guided relay in accordance with one or more embodiments will be discussed. Information handling system 600 of FIG. 6 may tangibly embody display system 100 as shown in and described with respect to FIG. 1. Although information handling system 600 represents one example of several types of computing platforms, including cell phones, personal digital assistants (PDAs), netbooks, notebooks, internet browsing devices, tablets, and so on, information handling system 600 may include more or fewer elements and/or different arrangements of the elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a video/graphics system 620 to drive a display device, which may comprise projector 636, coupled to information handling system 600. Photonics module 636 may comprise the photonics module 110 of FIG. 1. In one or more embodiments, video/graphics system 620 may couple to one or more of processors 610 and/or 612 and may be disposed on the same core as the processor 610 and/or 612, although the scope of the claimed subject matter is not limited in this respect.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a baseband and radio-frequency (RF) block 632 comprising a base band processor and/or RF circuits and devices for wireless communication with other wireless communication devices and/or via wireless networks via antenna 634, although the scope of the claimed subject matter is not limited in these respects.

In one or more embodiments, information handling system 600 may include a photonics module 636 that may correspond to photonics module 110 of FIG. 1 and which optionally may include any one or more or all of the components of the scanned beam display of FIG. 5 such as controller 522, horizontal drive circuit 518, vertical drive circuit 520, and/or laser source 510. Furthermore, photonics module 636 may include or otherwise be coupled with exit pupil module 112 and substrate guided relay 114 of FIG. 1 wherein the substrate guided relay 114 includes an absorbing edge 216 as discussed herein. In one or more embodiments, photonics module 636 may be controlled by one or more of processors 610 and/or 612 to implement some or all of the functions of controller 522 of FIG. 5. In one or more embodiments, photonics module 636 may comprise a MEMS based scanned laser display for displaying an image 640 projected by photonics module 636. In one or more embodiments, a display system 100 of FIG. 1 may comprise video/graphics block 620 having a video controller to provide video information 638 to projector 636 to display an image 640. In one or more embodiments, information handling system 600 may couple to a display system 100 of FIG. 1, for example where display system 100 comprises a head up display system disposed in an eyewear or headgear apparatus coupled to the information handling system 600 wherein photonics module 636 comprises the photonics module 110 of FIG. 1 in addition to exit pupil module 112 and substrate guided relay 114 having an absorbing edge 216 as discussed herein. However, these are merely example implementations of display system 100 with information handling system 600, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a substrate guided relay having an absorbing edge to reduce alignment constraints and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A display system, comprising:
   a photonics module to generate an image as an output light; and
   a substrate guided relay to receive the output light from the photonics module as an input light to generate multiple copies of input light from and to homogenize the input light, the substrate guided relay comprising:
   a slab guide having a first surface, a first end, a second end, and a first edge, wherein the slab guide has an absorbing edge disposed at the first end;
   an input coupler disposed on the first surface of the slab guide at the first end of the slab guide and at an angle with respect to the first edge of the slab guide;
   an output coupler disposed on the first surface of the slab guide at the second end of the slab guide; and
   an exit pupil module to receive the output light from the photonics module to alter an exit pupil of the input light provided to the substrate guided relay to cause the exit pupil to be suitable for a pupil of a user;
   wherein light rays that enter the slab guide via the input coupler toward the first end are absorbed by the absorbing edge and light rays that enter the slab guide via the input coupler toward the output coupler exit the slab guide via the output coupler.

2. A display system as claimed in claim 1, wherein alignment of the input coupler with respect to the first edge of the slab guide does not adversely affect image quality of an image projected through the substrate guided relay.

3. A display system as claimed in claim 1, wherein the input coupler comprises two or more parallel internal surfaces to facilitate generation of multiple couples of an input beam and to direct the copies of the input beam into the slab guide.

4. A display system as claimed in claim 1, wherein the output coupler comprises two or more parallels internal surfaces to facilitate redirection of multiple copies of an input beam to exit the slab guide via the output coupler.

5. A display system as claimed in claim 1, wherein the exit pupil module comprises a microlens array to expand the exit pupil provided to the substrate guided relay.

6. A display system as claimed in claim 1, wherein the photonics module comprises a scanned beam display, a digital light projector, or a liquid-crystal on silicon display, or combinations thereof.

7. A display system as claimed in claim 1, wherein the photonics module and the substrate guided relay are disposed on a head mounted apparatus as a head-up display.

8. An information handling system, comprising:
   a processor and a memory coupled to the processor, the memory having an image to be displayed stored therein, and a display system coupled to the processor to display the image stored in the memory, the display system comprising:
   a photonics module to generate an image as an output light; and
   a substrate guided relay to receive the output light from the photonics module as an input light to generate multiple copies of input light from and to homogenize the input light, the substrate guided relay comprising:
   a slab guide having a first surface, a first end, a second end, and a first edge, wherein the slab guide has an absorbing edge disposed at the first end;
   an input coupler disposed on the first surface of the slab guide at the first end of the slab guide and at an angle with respect to the first edge of the slab guide;
   an output coupler disposed on the first surface of the slab guide at the second end of the slab guide; and
   an exit pupil module to receive the output light from the photonics module to alter an exit pupil of the input light provided to the substrate guided relay to cause the exit pupil to be suitable for a pupil of a user;

wherein light rays that enter the slab guide via the input coupler toward the first end are absorbed by the absorbing edge and light rays that enter the slab guide via the input coupler toward the output coupler exit the slab guide via the output coupler.

9. An information handling system as claimed in claim 8, wherein alignment of the input coupler with respect to the first edge of the slab guide does not adversely affect image quality of an image projected through the substrate guided relay.

10. An information handling system as claimed in claim 8, wherein the input coupler comprises two or more parallel internal surfaces to facilitate generation of multiple couples of an input beam and to direct the copies of the input beam into the slab guide.

11. An information handling system as claimed in claim 8, wherein the output coupler comprises two or more parallels internal surfaces to facilitate redirection of multiple copies of an input beam to exit the slab guide via the output coupler.

12. An information handling system as claimed in claim 8, wherein the exit pupil module comprises a microlens array to expand the exit pupil provided to the substrate guided relay.

13. An information handling system as claimed in claim 8, wherein the photonics module comprises a scanned beam display, a digital light projector, or a liquid-crystal on silicon display, or combinations thereof.

14. An information handling system as claimed in claim 8, wherein the photonics module and the substrate guided relay are disposed on a head mounted apparatus as a head-up display.

\* \* \* \* \*